(12) United States Patent
Dracup et al.

(10) Patent No.: US 7,634,432 B2
(45) Date of Patent: Dec. 15, 2009

(54) SYSTEMS AND METHODS FOR PROVIDING EMPLOYEE COMPENSATION

(75) Inventors: Dennis G. Dracup, Libertyville, IL (US); Alan F. Wilson, Salinas, CA (US)

(73) Assignee: Language Line Services, Inc., Monterey, CA (US)

( * ) Notice: Subject to any disclaimer, the term of this patent is extended or adjusted under 35 U.S.C. 154(b) by 37 days.

(21) Appl. No.: 11/693,636

(22) Filed: Mar. 29, 2007

(65) Prior Publication Data

US 2008/0243652 A1    Oct. 2, 2008

(51) Int. Cl.
*G07C 1/10* (2006.01)

(52) U.S. Cl. .............. 705/32; 705/34; 705/9; 705/8; 705/52

(58) Field of Classification Search .......... 705/32, 705/34, 9, 8, 52
See application file for complete search history.

(56) References Cited

U.S. PATENT DOCUMENTS

| | | | |
|---|---|---|---|
| 5,392,343 A | 2/1995 | Davitt et al. | |
| 5,684,867 A | 11/1997 | Gesslein, Jr. et al. | |
| 5,960,070 A | 9/1999 | O'Donovan | |
| 6,134,306 A | 10/2000 | Lautenschlager et al. | |
| 6,205,215 B1 | 3/2001 | Dombakly | |
| 6,263,058 B1 | 7/2001 | Lautenschlager et al. | |
| 6,401,079 B1 * | 6/2002 | Kahn et al. | 705/30 |
| 6,735,574 B2 * | 5/2004 | Bull | 705/32 |
| 6,826,269 B2 | 11/2004 | Afana | |
| 6,850,905 B2 | 2/2005 | Kelly | |
| 6,999,758 B2 | 2/2006 | Pence et al. | |
| 7,376,415 B2 | 5/2008 | Surette | |
| 2001/0034599 A1 | 10/2001 | Kage et al. | |
| 2002/0046112 A1 * | 4/2002 | Nitta et al. | 705/14 |
| 2002/0184148 A1 * | 12/2002 | Kahn et al. | 705/40 |
| 2003/0046196 A1 * | 3/2003 | Kelly | 705/32 |
| 2003/0154122 A1 | 8/2003 | Jackson, Jr. et al. | |
| 2004/0014462 A1 | 1/2004 | Surette | |

(Continued)

FOREIGN PATENT DOCUMENTS

JP    2004023262    1/2004

(Continued)

OTHER PUBLICATIONS

Cichelli, David J., Compensation management—Methods; Sales personnel—Compensation and benefits, Jul.-Aug. 2006, The Nielsen Company, Sales & Marketing Management, v 158, n 6, p. 25(1), ISSN: 0163-7517.*

(Continued)

*Primary Examiner*—F. Zeender
*Assistant Examiner*—Fateh M Obaid
(74) *Attorney, Agent, or Firm*—Patent Ingenuity, P.C.; Samuel K. Simpson (57) ABSTRACT

Methods and systems of determining compensation for an hour of work to an employee are disclosed. A base hourly wage is determined based on the number of hours worked by the employee. A premium hourly wage is determined. The premium hourly wage can be determined by subtracting the base hourly wage from the earned hourly wage. The earned hourly wage can be calculated based on a number of minutes actually worked within the hour of work and a per-minute rate.

9 Claims, 8 Drawing Sheets

U.S. PATENT DOCUMENTS

| | | | |
|---|---|---|---|
| 2004/0019542 A1* | 1/2004 | Fuchs et al. | 705/32 |
| 2004/0088234 A1* | 5/2004 | Kelly | 705/32 |
| 2004/0218751 A1* | 11/2004 | Colson et al. | 379/265.09 |
| 2005/0129215 A1 | 6/2005 | Parker | |
| 2005/0152530 A1 | 7/2005 | Pence et al. | |
| 2005/0216252 A1 | 9/2005 | Schoenbach et al. | |
| 2006/0165225 A1 | 7/2006 | Sahashi | |
| 2006/0229900 A1 | 10/2006 | Paul et al. | |

FOREIGN PATENT DOCUMENTS

| | | |
|---|---|---|
| JP | 2004023262 ABST | 1/2004 |
| RU | 2142135 ABST | 12/1999 |
| RU | 2143135 | 12/1999 |

OTHER PUBLICATIONS

PCT International Search Report dated Jun. 26, 2008 for PCT/US08/58793.

* cited by examiner

|  | Day 1 | Day 2 |
|---|---|---|
| Hour 1 | X | X |
| Hour 2 | X | X |
| Hour 3 | X | X |
| Hour 4 | X | X |
| Hour 5 |  | X |
| Hour 6 |  | X |
| Hour 7 |  | X |
| Hour 8 |  | X |
| Hour 9 |  | X |
| Hour 10 |  | X |

*FIG. 4*

| Base Hourly Wage | | |
|---|---|---|
|  | Day 1 | Day 2 |
| Hour 1 | $6 | $6 |
| Hour 2 | $6 | $6 |
| Hour 3 | $6 | $6 |
| Hour 4 | $6 | $6 |
| Hour 5 |  | $6 |
| Hour 6 |  | $6 |
| Hour 7 |  | $6 |
| Hour 8 |  | $6 |
| Hour 9 |  | $9 |
| Hour 10 |  | $9 |

*FIG. 5*

| Number of Minutes Worked in each hour ||| 
|---|---|---|
|  | Day 1 | Day 2 |
| Hour 1 | 23 | 45 |
| Hour 2 | 35 | 10 |
| Hour 3 | 12 | 18 |
| Hour 4 | 40 | 37 |
| Hour 5 |  | 31 |
| Hour 6 |  | 22 |
| Hour 7 |  | 22 |
| Hour 8 |  | 8 |
| Hour 9 |  | 37 |
| Hour 10 |  | 19 |

| Premium Hourly Wage | | |
|---|---|---|
| | Day 1 | Day 2 |
| Hour 1 | $0 | $3 |
| Hour 2 | $1 | $2 |
| Hour 3 | $0 | $2 |
| Hour 4 | $2 | $1.4 |
| Hour 5 | | $0.2 |
| Hour 6 | | $0 |
| Hour 7 | | $0 |
| Hour 8 | | $0 |
| Hour 9 | | $0 |
| Hour 10 | | $0 |

*FIG. 7*

| Total Wages | | |
|---|---|---|
| | Day 1 | Day 2 |
| Base Wages | $24 | $66 |
| Premium Wages | $3 | $4.46 |

*FIG. 8*

SYSTEMS AND METHODS FOR PROVIDING EMPLOYEE COMPENSATION

BACKGROUND

1. Field

The present disclosure relates to compensation of employees. In particular, it relates to systems and methods of calculating employee wages.

2. General Background

In various businesses and industries employees only work a portion of the compensated hour of work. These businesses are generally ones in which the employee must wait until the employee's services are demanded by a customer. Compensating such employees can be difficult because productivity fluctuates depending on customer demand. A typical example is waiters in restaurants. In order to compensate a waiter, a restaurant provides a minimum wage, and the waiter receives further compensation through tips by patrons. In other businesses, such as telecommunications or telemarketing businesses, customer service representatives that service customers via a telephone line are compensated at a flat rate without regard as to whether the customer service representative worked more or less during a given hour of work.

SUMMARY

In one aspect, there is a method of determining compensation for an hour of work to an employee. A base hourly wage is determined by calculating whether payment for the hour of work is a base rate or an overtime rate. The base rate is paid if the hour of work occurred during regular work hours. The overtime rate is paid if the hour of work occurred during hours worked beyond a predetermined overtime threshold. A premium hourly wage is determined. The premium hourly wage can be determined by determining or identifying the number of minutes actually worked within the hour of work. An earned hourly wage is calculated based on the number of minutes actually worked within the hour of work and a per-minute rate. The base hourly wage is subtracted from the earned hourly wage to determine the premium hourly wage.

In a further aspect, the employee is paid the base hourly wage and the premium hourly wage for the hour of work. If the premium hourly wage is calculated to be less than zero, the premium hourly wage paid to the employee is zero. The per-minute rate is variable upon the skill of the employee.

In another aspect, the employee is a language interpreter, and the minutes actually worked correspond to minutes in which the language interpreter is actively interpreting a conversation.

In another aspect, there is a system of determining compensation for an hour of work to an employee. The system can comprise a base wage calculation module, and a premium wage calculation module. The base wage calculation module that is configured to determine a base hourly wage by calculating whether payment for the hour of work is a base rate or an overtime rate. The base wage calculation module is configured to calculate that the base rate is to be paid if the hour of work occurred during regular work hours. The base wage calculation module can be further configured to calculate that the overtime rate is to be paid if the hour of work occurred during hours worked beyond a predetermined overtime threshold.

Furthermore, the premium wage calculation module configured to determine a premium hourly wage. The premium wage calculation module is configured to determine the number of minutes actually worked within the hour of work to calculate an earned hourly wage based on the number of minutes actually worked within the hour of work and a per-minute rate. The premium wage calculation module further configured to determine the premium hourly wage by subtracting the base hourly wage from the earned hourly wage.

In yet another aspect, there is a method of determining compensation for an hour of work to an employee. A base hourly wage based on the number of hours worked by the employee is determined. A number of minutes actually worked within the hour of work is determined. An earned hourly wage based on the number of minutes actually worked within the hour of work and a per-minute rate. The base hourly wage is subtracted from the earned hourly wage to calculate a premium hourly wage. The base hourly wage and the premium hourly wage are paid to the employee.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

Methods and systems of compensating premium wages to employees are disclosed herein. The premium wages are calculated based on an additional per minute compensation. The per-minute rate can be a variable rate that changes depending on the task being completed by the employee. For example, if the employee is an interpreter, the per-minute rate can vary according to the languages being interpreted, the time of day, etc. In addition, if the per-minute basis compensation does not reach a threshold of a minimum amount of compensation, a minimum amount of compensation is provided to the employee. In one embodiment, the minimum amount of compensation is provided based on a minimum wage. Compensation per-minute is calculated based on the number of actual minutes worked within an hour of work. This scenario is normal in industries such as a customer service industry wherein a customer service representative may be attending customer only a certain number of minutes (e.g., only a portion of the hour).

Figure 1:
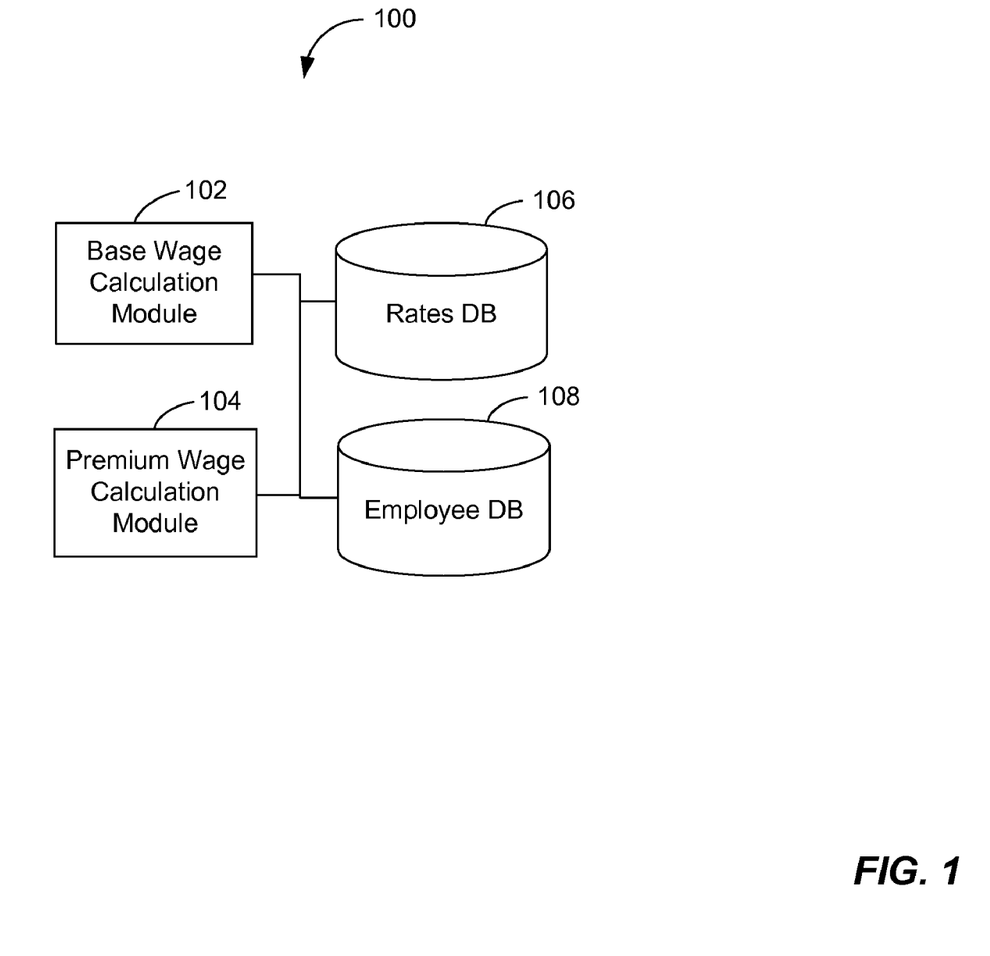
FIG. 1 depicts a component diagram of a system for providing employee compensation according to one embodiment.

FIG. 1 depicts a component diagram base system for providing employee compensation according to one embodiment. The system 100 can include one or more computer programmed modules or other logic that can perform computing functions. Likewise, the system 100 can include one or more databases or memory or data repositories in which employee information rates and other financial and payroll data can be stored. In one embodiment, a base wage calculation module 102 can be part of the system 100 and be configured to calculate base wages for one or more employees. The base wages can be calculated by the base wage calculation module 102 according to rates stored at the database 106. For example, rates stored at the database 106 can correspond to rates paid for a work date hour that is within an eight hour period. In addition, an overtime rate can be included in the rates database 106 that corresponds to an hour that has been worked by an employee in a period between eight hours and twelve hours of work. Thus, if an employee works during the day anywhere from eight hours to twelve hours the overtime rate can apply starting on the eight hour. For example, an overtime rate can be the minimum wage times a factor of 1.5. In another example, a secondary overtime rate can be also included for hours that have been worked beyond a twelve-hour threshold. If the employee works more than twelve hours then the secondary overtime rate can be minimum wage times a factor of 2. Of course, the overtime rates can be configured to be different according to the desire of a particular employer. As such, the base wage calculation module 102 can be configured with logic to look up the applicable base rate and apply the base rate to the hours worked by an employee.

In another embodiment, an employee database 108 can be configured to store employee data such as employee profiles, payroll data, etc. In addition, each employee profile can reference the rates database 106 in order to associate the rates paid to an employee. For example, an employee may be paid a specific base rate, a specific per minute rate, and specific overtime rate.

A premium wage calculation module 104 can also be part of the system 100 in order to provide the ability to calculate premium wage information for each employee. The premium wage calculation module 104 can be configured with logic to look up the premium rates of each employee at the rates database 106 and calculate a premium wage according to minutes actually worked by each employee. The premium wage calculation module 104 calculates the premium wage of an employee by multiplying the number of minutes that the employee had actually worked by the per-minute rate. As previously mentioned, this configuration is especially beneficial to jobs where an employee may be on standby waiting for a specific work to be performed such that only a percentage of the time corresponding to an hour is actually worked. For example, in an interpretation business, an interpreter may be on standby for an hour. Within that hour the interpreter may actually interpret telephone calls or other conversations for twenty minutes, or any other portion of the hour. As such, an interpreter can be compensated based on the minutes actually worked within the hour. Such compensation can be calculated by the premium wage calculation module 104. Therefore, the premium wage paid to the interpreter would be an additional amount to the base wage paid to the interpreter if the number of minutes surpassed a specific threshold. As discussed below, the premium wage calculation module 104 can be configured to calculate the premium wage paid to the employee based on each hour that the employee is compensated for.

In addition, the base wage calculation module 102 and the premium wage calculation module 104 can be configured to aggregate the hours worked by an employee based on a quarter hour. In one embodiment, the paid hour may not be a continuous clock time. In another embodiment, the paid hour can be a continuous clock time and employees are paid by a continuous hour of work.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
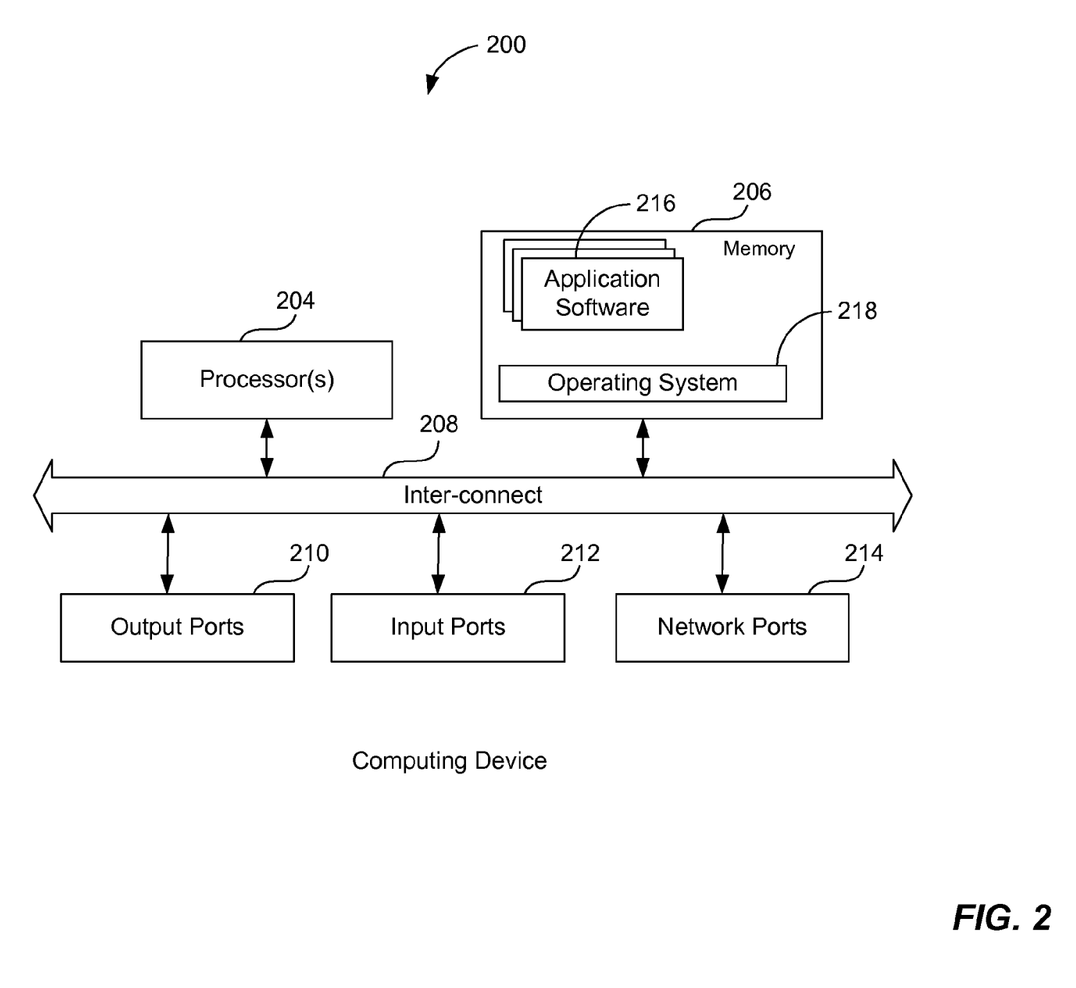
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, and receive and transmit digital signals, as required by various computing modules disclosed herein. For example, the computing device 200 can be utilized to process calculations, execute instructions, receive and transmit digital signals, and receive and transmit search queries, job listings, and hypertext, as required by the base wage calculation module 102, and the premium wage calculation module 104.

The computing device 200 can be any general or special purpose computer now known or to become known capable of performing the steps and/or performing the functions described herein, either in software, hardware, firmware, or a combination thereof.

The computing device 200 includes an interconnect 208 (e.g., bus and system core logic), which interconnects microprocessor(s) 204 and memory 206. The interconnect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 may include ROM (Read Only Memory), and volatile RAM (Random Access Memory) and non-volatile memory, such as a hard drive, flash memory, etc. Volatile RAM is typically implemented as dynamic RAM (DRAM), which requires continuous power in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

Figure 3:
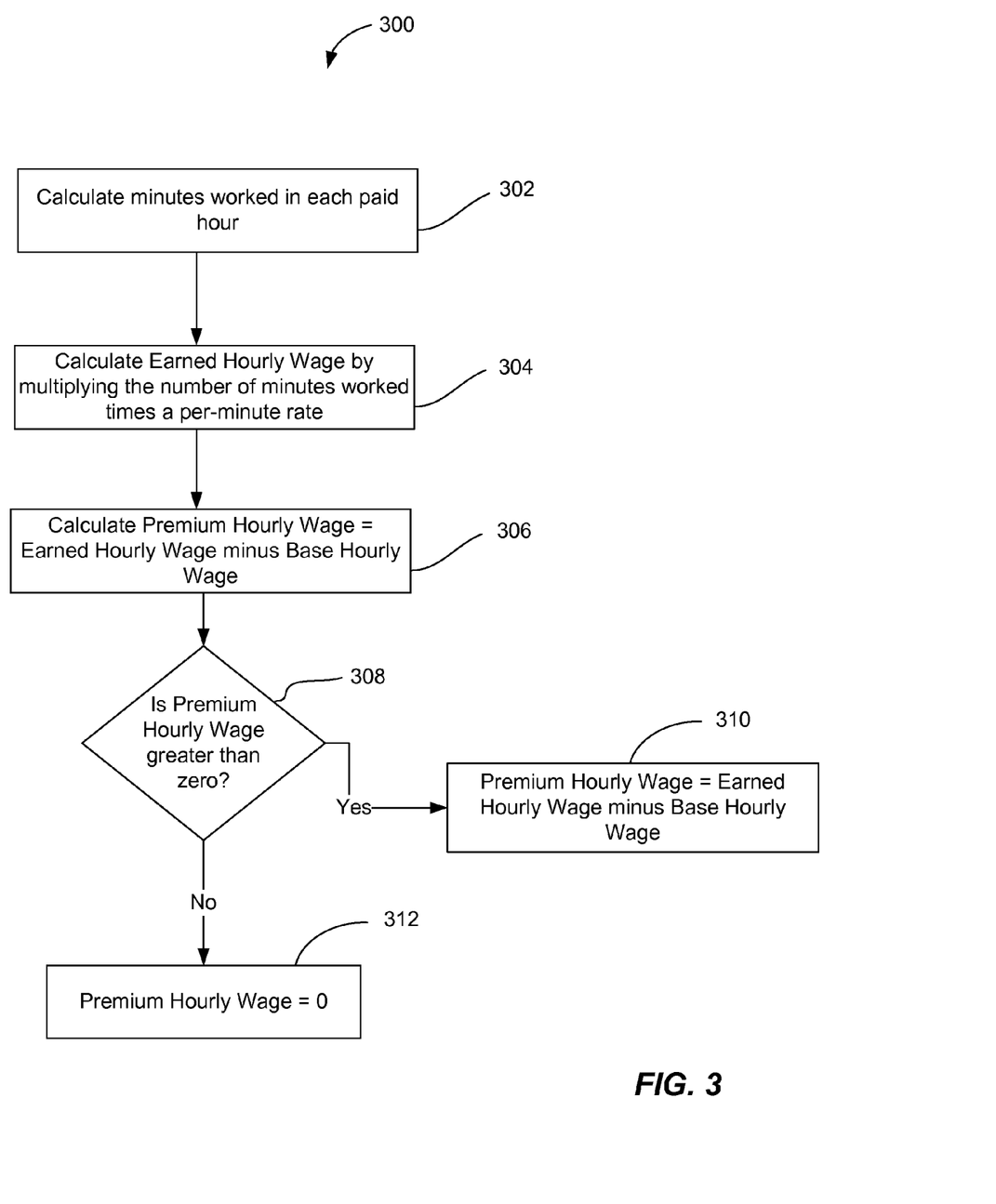
FIG. 3 depicts a flow diagram of a process for providing employee compensation according to one embodiment.

FIG. 3 depicts a flow diagram of a process for providing employee compensation according to one embodiment. Process 300 is a process that illustrates how a premium hourly wage is calculated. At process block 302 the number of minutes worked in each paid hour is calculated. Therefore, as previously mentioned if an employee works for thirty minutes of the hour, the number of minutes calculated would be thirty. Process 300 continues at process block 304.

At process block 304 the earned hourly wage is calculated by multiplying the number of minutes worked times a per-minute rate. The per-minute rate may vary from employee to employee thus the earned hourly wage reflects the earned amount of money that a employee may receive for a particular hour based on the number of minutes worked. Process 300 continues at process block 306. The process block 306 the premium hourly wage is calculated by subtracting the base hourly wage from the earned hourly wage. Process 300 continues at process block 308. At process block 308 the determination is made as to whether or not the premium hourly wage is greater than zero. In one embodiment, the premium hourly wage can be less than zero if the base hourly wage is greater than the earned hourly wages. In that case, the process continues at process block at 312 where the premium hourly wage is set to be zero. Otherwise, if the premium hourly wage calculated at process block 306 is determined to be greater than zero, than process block 308 continues to process block 310 wherein the premium hourly wage is set to be the difference of the earned hourly wage and the base hourly wage as previously calculated.

Figure 4:
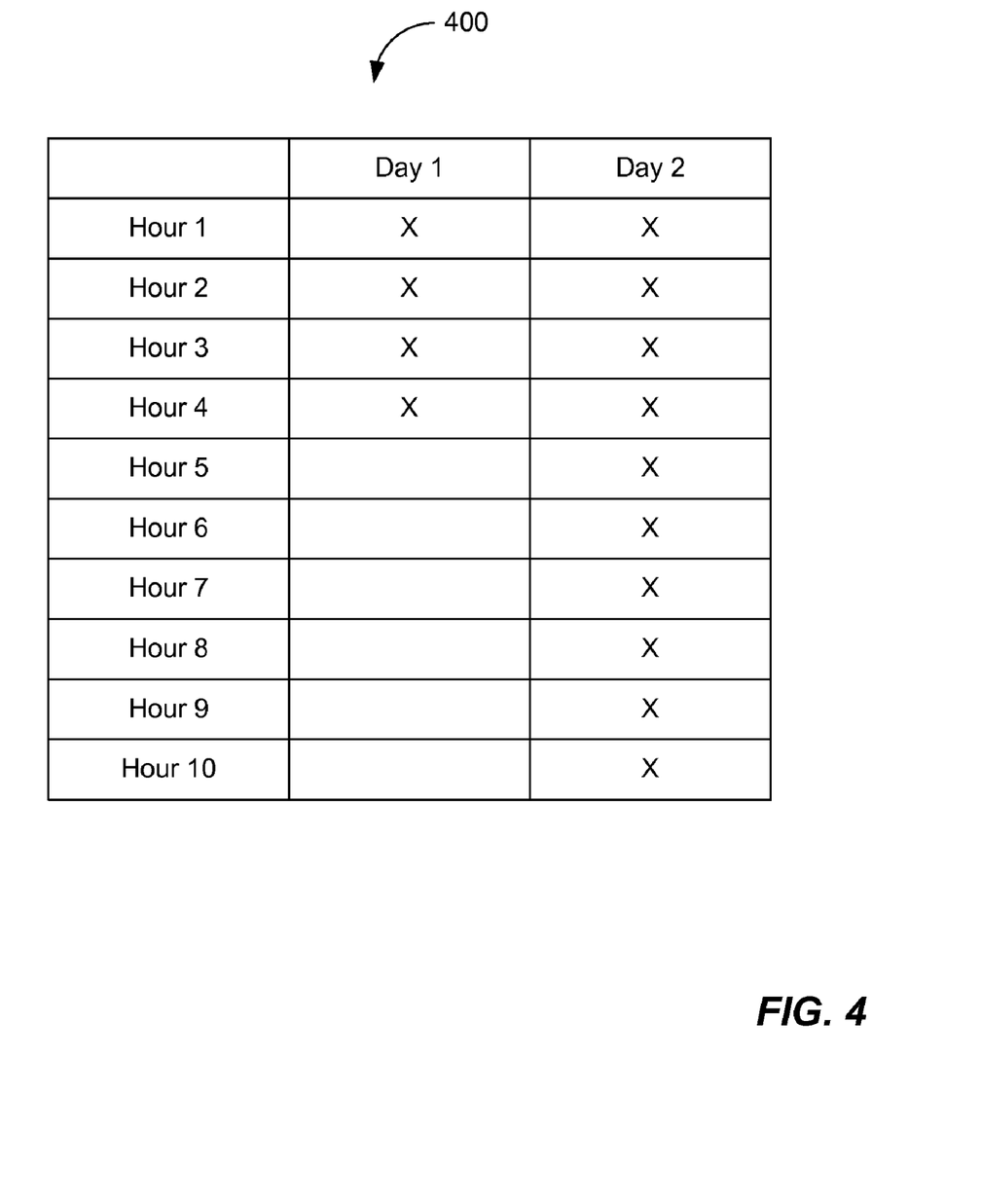
FIG. 4 depicts a table that is exemplary of the number hours worked by an employee during two days according to one embodiment.

FIG. 4 depicts a table that is exemplary of the number of hours worked by an employee during two days according to one embodiment. As illustrated in table 400, during day one an employee has worked four hours. In one embodiment, the four hours are an aggregation of multiple quarter hours that have been worked by the employee throughout the day. In another embodiment, the four hours can be four consecutive hours worked by the employee. Table 400 also shows that in Day 2 the employee has worked for ten hours. This again can be by aggregation of quarter hours in or consecutive hours worked by the employee.

Figure 5:
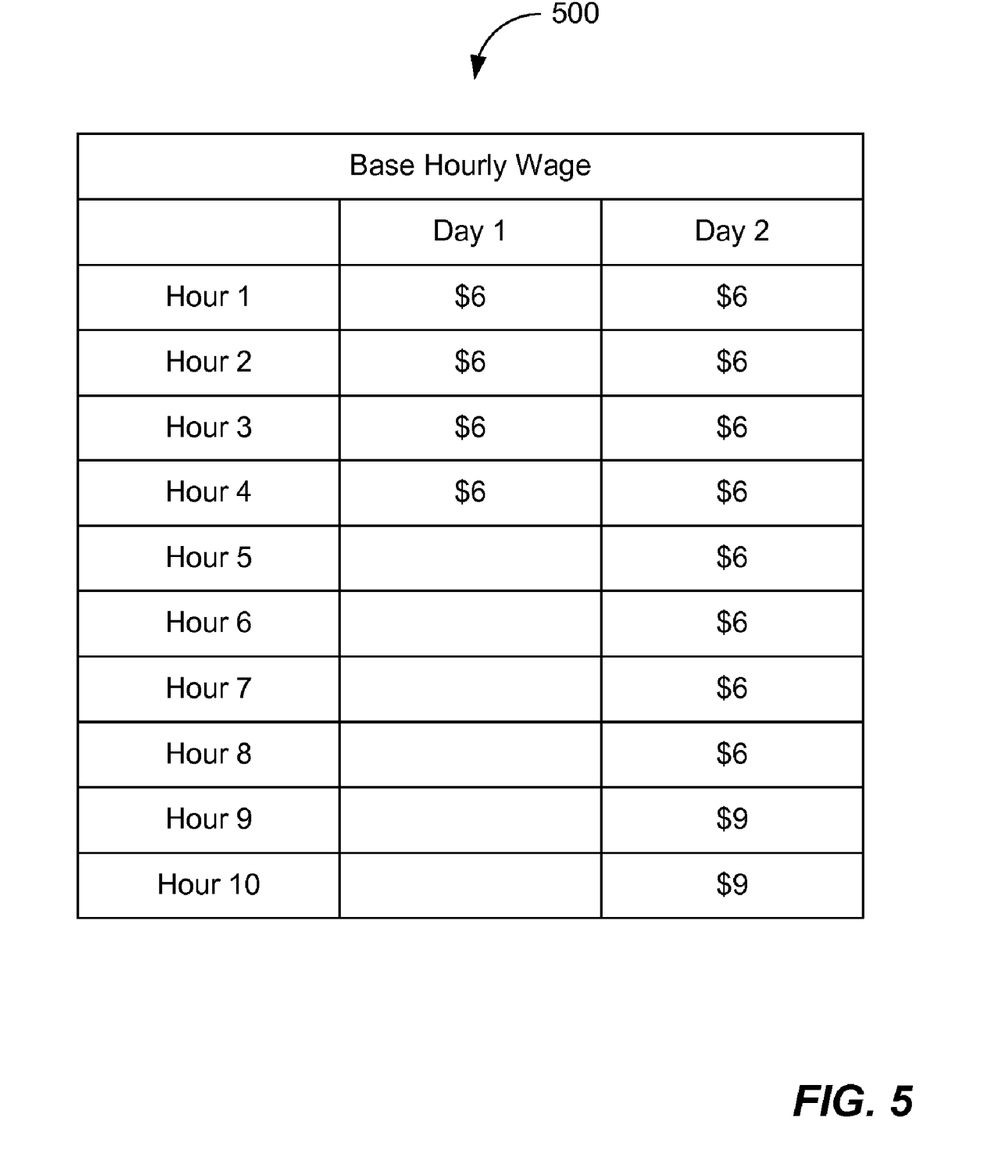
FIG. 5 depicts a table that is exemplary of the base hourly wage for the hours worked by an employee during two days according to one embodiment.

FIG. 5 depicts a table that is exemplary of the base hourly wage for the hours worked by an employee during two days according to one embodiment. Using the hours worked by the employee as illustrated in FIG. 4, the hourly wage for each hour is determined based on predetermined rates that an employer can establish. In one example, as depicted in table 500, during Day 1, for the first four hours the employee will be compensated $6 for the hour. Furthermore, during Day 2 the employee will be compensated $6 per hour for the first eight hours. Thereafter the employee can be compensated with an overtime rate that includes a factor of 1.5 of the basic rate of the employee. Thus, on Hour 9, and on Hour 10 of Day 2, the employee can have an hourly wage of $9 each for Hour 9, and for Hour 10. As previously mentioned, the factors for overtime can be varied as one skilled in the art can understand. For example, after the threshold of the eighth hour, the overtime factor can be two, such that Hour 9 and Hour 10 would be an hourly wage of $12 per hour each. Likewise, additional or different rates can be determined or established by an employer. For example, an employer might establish that during a week hour any hours worked beyond forty hours can less than or equal to forty-eight hours can be multiplied by a factor of 1.5 to calculate the hourly wage.

Figure 6:
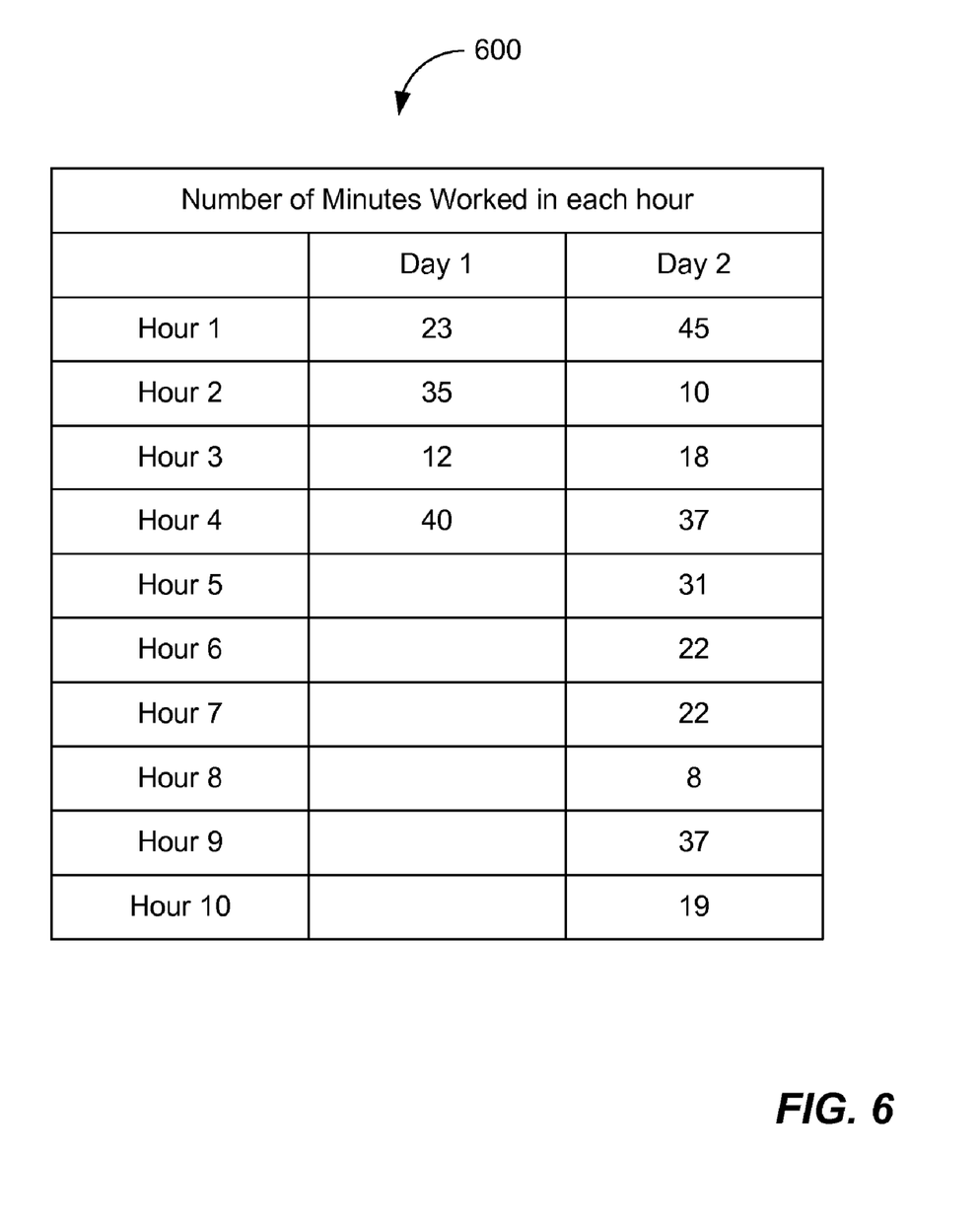
FIG. 6 depicts a table that is exemplary of the number of minutes per hour actually worked by an employee during two days according to one embodiment.

FIG. 6 depicts a table that is exemplary of the number of minutes per hour actually worked by an employee during two days according to one embodiment. Table 600 includes the calculated number of minutes that the employee worked during each hour of the Day 1 and Day 2. The hours illustrated in Table 6 correspond to the same hours of Tables 400 and 500. As one skilled in the art will understand the hours of these tables are not necessarily consecutive but can be an aggregation. Furthermore, Hour 1 of Day 1 may not necessarily occur at the same time as Hour 1 of Day 2.

As illustrated in table 600, during Day 1 the employee has worked twenty three minutes during the first hour, thirty five minutes during the second hour, twelve minutes during the third hour, and forty during the fourth hour. Thus, for example, the employee had actually worked twenty three minutes during the Hour 1, while during the rest of the time the employee was on stand-by waiting for the job to require his skill or attention. As mentioned above, this is particularly true in cases where individuals are waiting on a telephone line such as operators, telephone representatives and interpreters. Table 600 also includes a calculation of a total number of minutes worked by the employee during each hour of Day 2. As such in Day 2, the employee has worked forty five minutes during the first hour, ten minutes during the second hour, eighteen minutes during the third hour, and thirty seven minutes during the fourth hour and so on.

Figure 7:
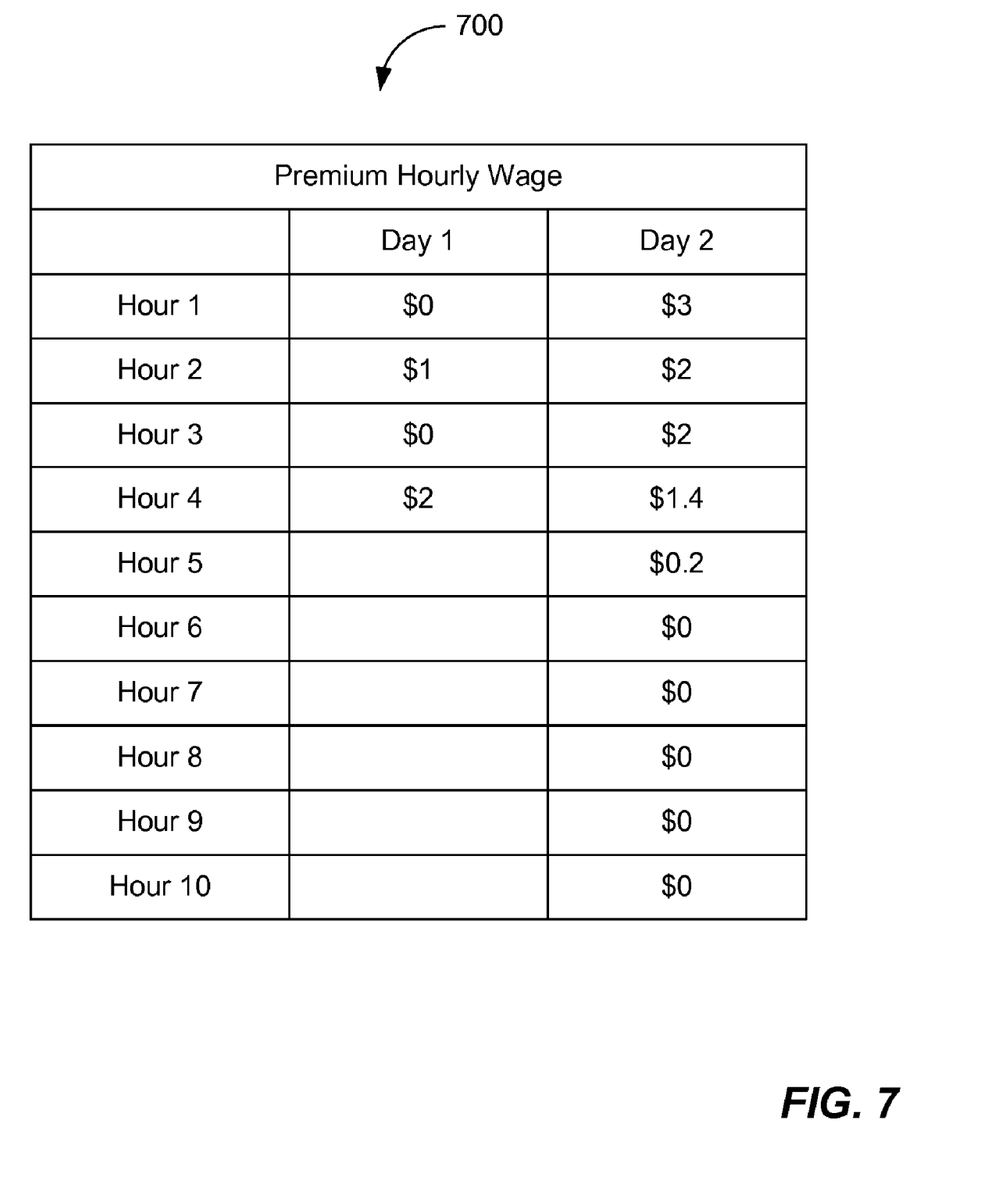
FIG. 7 depicts a table that is exemplary of the premium hourly wage for the hours worked by an employee during two days according to one embodiment.

FIG. 7 depicts a table that is exemplary of the premium hourly wage for the hours worked by an employee during two days according to one embodiment. The premium hourly wage is calculated according to the process described in relation to FIG. 3. The premium hourly wages shown in Table 700 are calculated based on an exemplary per-minute rate of twenty cents per minute. Of course, the per-minute rate can vary according to the task being performed by the employee, the skill of the employee, or any other factor established rate by an employer.

In one example, during Day 1 of Hour 1, the employee receives a premium hourly wage of $0.00. As illustrated in table 600, the employee had worked twenty three minutes during the Hour 1 of Day 1. Because the per-minute rate is twenty cents per minute, the twenty three minutes of work multiplied by twenty cents per minute yields a total of $4.60. As illustrated in table 500, the base hourly wage for Hour 1 of Day 1 is $6. Therefore, the earned hourly wage of $4.6 minus the base hourly wage of $6 yields a result that is less than zero and therefore the premium hourly wage for Hour 1 of Day 1 is zero.

In another example, Hour 2 of Day 1 the employee has earned a premium hourly wage of $1.00. The premium hourly wage of $1.00 has been calculated based on thirty five minutes actually worked by the employee during the second hour. Thus, because the per-minute rate is twenty cents, the twenty cents multiplied by thirty five minutes worked during Hour 2 yields an earned hourly wage of $7. As mentioned above, the premium hourly wage is calculated by subtracting the earned hourly wage minus the base hourly wage. The earned hourly wage in of $7 minus the base hourly wage of $6 yields a premium hourly wage of $1.00. The hours during Day 1 and Day 2 are calculated similarly.

In yet another example, Hour 9 of Day 2 is calculated based on a base hourly wage of $9.00 as shown in table 500. During Hour 9 of Day 2, the employee has worked thirty seven minutes of the hour at the per-minute rate of twenty cents. Thus, the earned hourly wage for Hour 9 of Day 2 is $7.40. The premium hourly wage is $7.40 minus the base hourly wage of $9 yields a result that is less than zero and therefore the premium hourly wage for Hour 9 of Day 2 is zero. Because Hour 9 is paid at an overtime rate, the base hourly wage is higher and therefore no premium hourly wage is paid. In another example, if the employee had worked fifty minutes during Hour 9, then the earned hourly wage would have been $10, and the premium hourly wage would have been $1. In alternate embodiments, the per-minute rate for overtime hours can be higher than the per-minute rate for regular hours.

Accordingly, the premium hourly wage calculation of table 700 illustrates how an employee may be able to receive additional compensation based on the number of minutes actually worked within the hour. For example, on Day 2 during the Hour 1, the employee had worked forty five minutes and therefore not only does the employee receive a base hourly wage of $6, but in addition, the employee also receives a premium hourly wage of $3, thereby earning a total wage of $9.00 for that hour.

Figure 8:
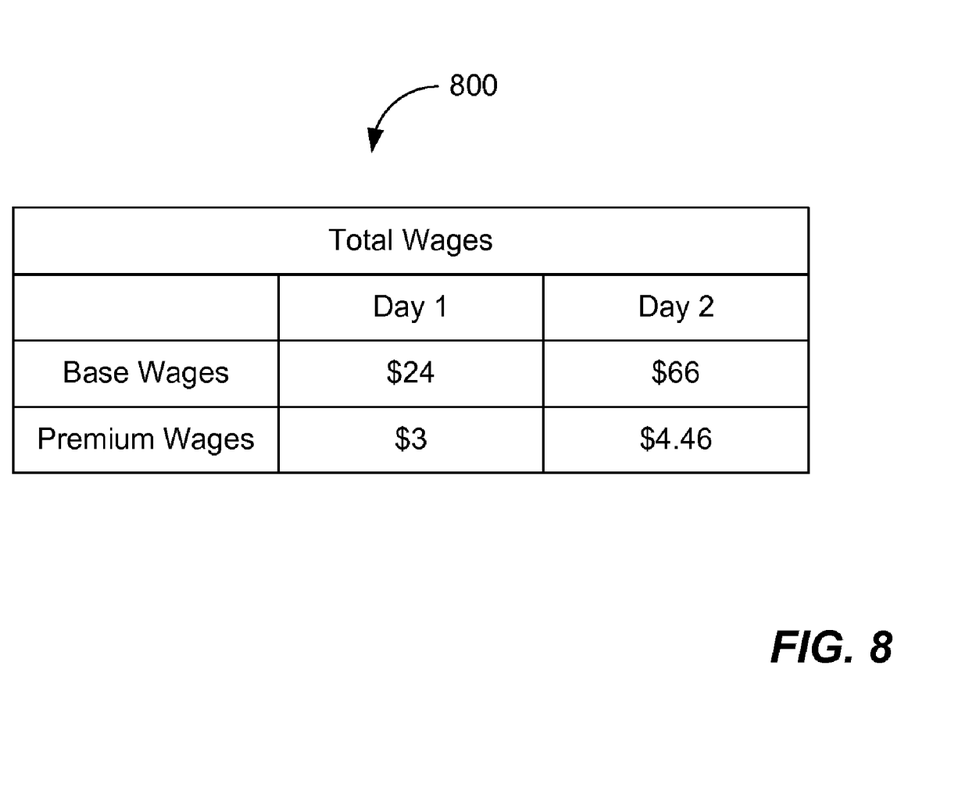
FIG. 8 depicts a table that is exemplary of the total wages of an employee for two days of work according to one embodiment.

FIG. 8 depicts a table that is exemplary of the total wages of an employee for two days of work according to one embodiment. As such, table 800 includes the wages calculated according to the wages of Day 1 and Day 2 as illustrated throughout FIGS. 5, 6 and 7. During Day 1 the base wages received by the employee are $24 corresponding to $6 an hour for four hours of work. In addition, during Day 1 the employee had received an additional $3 for the actual number of minutes worked during the four hours. Furthermore, during Day 2 the base wages have been $66.00. These base wages include the two hours of overtime at $9 each. In addition, the employee has also earned premium wages of $4.43.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions can be distributed among software applications at either the client or server level or both. In this regard, any number of the features of the different embodiments described herein may be combined into single or multiple embodiments, and alternate embodiments having fewer than or more than all of the features herein described are possible.

Functionally may also be, in whole or in part, distributed among multiple components, in manners now known or to become known. Thus, myriad software/hardware/firmware combinations are possible in achieving the functions, features, interfaces and preferences decribed herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method of determining compensation for an hour of work to an employee, comprising:
   determining, with a computing device, a base hourly wage by calculating whether payment for the hour of work is a base rate or an overtime rate, wherein the base rate is paid if the hour of work occurred during regular work hours, wherein the overtime rate is paid if the hour of work occurred during hours worked beyond a predetermined overtime threshold; and
   determining, with the computing device, a premium hourly wage, wherein the premium hourly wage is determined by:
      determining the number of minutes actually worked within the hour of work;
      calculating an earned hourly wage based on the number of minutes actually worked within the hour of work and a per-minute rate; and
      subtracting the base hourly wage from the earned hourly wage;
   providing the base hourly wage to the employee; and
   providing the premium hourly wage to the employee if a result from the subtracting the base hourly wage from the earned hourly wage is greater than zero.

2. The method of claim 1, wherein if the premium hourly wage is calculated to be less than zero, the premium hourly wage paid to the employee is zero.

3. The method of claim 1, wherein the per-minute rate is variable upon the skill of the employee.

4. The method of claim 1, wherein the employee is a language interpreter, and the minutes actually worked correspond to minutes in which the language interpreter is actively interpreting a conversation.

5. A system of determining compensation for an hour of work to an employee, comprising:
   a computing device including:
      a base wage calculation module that is configured to determine a base hourly wage by calculating whether payment for the hour of work is a base rate or an overtime rate, wherein the base wage calculation module is configured to calculate that the base rate is to be paid if the hour of work occurred during regular work hours, wherein the base wage calculation module is configured to calculate that the overtime rate is to be paid if the hour of work occurred during hours worked beyond a predetermined overtime threshold; and
      a premium wage calculation module configured to determine a premium hourly wage, wherein the premium wage calculation module is configured to determine the number of minutes actually worked within the hour of work to calculate an earned hourly wage based on the number of minutes actually worked within the hour of work and a per-minute rate, the premium wage calculation module further configured to determine the premium hourly wage by subtracting the base hourly wage from the earned hourly wage, the base hourly wage being provided to the employee, the premium hourly wage being provided to the employee if a result from the subtracting the base hourly wage from the earned hourly wage is greater than zero.

6. The system of claim 5, wherein if the premium hourly wage is calculated to be less than zero, the premium hourly wage paid to the employee is zero.

7. The system of claim 5, wherein the per-minute rate is variable upon the skill of the employee.

8. The system of claim 5, wherein the employee is a language interpreter, and the minutes actually worked correspond to minutes in which the language interpreter is actively interpreting a conversation.

9. A method of determining compensation for an hour of work to an employee, comprising:
- determining, with a computing device, a base hourly wage based on the number of hours worked by the employee; and
- determining, with a computing device, a premium hourly wage, wherein the premium hourly wage is determined by:
- determining the number of minutes actually worked within the hour of work;
- calculating an earned hourly wage based on the number of minutes actually worked within the hour of work and a per-minute rate;
- subtracting the base hourly wage from the earned hourly wage;
- providing the base hourly wage to the employee; and providing the premium hourly wage to the employee if a result from the subtracting the base hourly wage from the earned hourly wage is greater than zero.

* * * * *